United States Patent
Kim et al.

(10) Patent No.: US 10,790,510 B2
(45) Date of Patent: Sep. 29, 2020

(54) LITHIUM ION BATTERY FOR AUTOMOTIVE APPLICATION

(71) Applicants: Umicore, Brussels (BE); Umicore Korea Ltd., Chungnam (KR)

(72) Inventors: Jeong-Rae Kim, Cheonan (KR); Gyeong-Ok Kim, Ulsan (KR); Xin Xia, Cheonan (KR); Jing Zhang, Cheonan (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 99 days.

(21) Appl. No.: 16/088,893

(22) PCT Filed: Mar. 9, 2017

(86) PCT No.: PCT/IB2017/051376
§ 371 (c)(1),
(2) Date: Sep. 27, 2018

(87) PCT Pub. No.: WO2017/168274
PCT Pub. Date: Oct. 5, 2017

(65) Prior Publication Data
US 2020/0168908 A1     May 28, 2020

(30) Foreign Application Priority Data
Mar. 31, 2016 (EP) .................................. 16163091

(51) Int. Cl.
*H01M 4/525* (2010.01)
*H01M 10/0525* (2010.01)
(Continued)

(52) U.S. Cl.
CPC ........... *H01M 4/525* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS 8,852,452 B2   10/2014   Paulsen et al.
2013/0175469 A1   7/2013   Paulsen et al.
(Continued)

FOREIGN PATENT DOCUMENTS

CN   101507041 A   8/2009
CN   103066261 A   4/2013
(Continued)

OTHER PUBLICATIONS

JP-2007048711-A English machine translation (Year: 2007).*
(Continued)

*Primary Examiner* — Scott J. Chmielecki
(74) *Attorney, Agent, or Firm* — NK Patent Law (57) ABSTRACT

A rechargeable lithium ion battery comprising a positive electrode, a negative electrode and an electrolyte, the positive electrode comprising a lithium nickel manganese cobalt oxide-based powder with particles comprising a core and a surface layer, the core having a layered crystal structure comprising the elements Li, M and oxygen, wherein M has the formula $M=(Ni_z(Ni_{1/2}Mn_{1/2})_yCo_x)_{1-k}A_k$, with $0.13 \leq x \leq 0.30$, $0.20 \leq z \leq 0.55$, $x+y+z=1$ and $0 < k \leq 0.1$, wherein A is at least one dopant and comprises Al, the lithium nickel manganese cobalt oxide-based powder having a molar ratio $0.95 \leq Li:M \leq 0.10$, wherein the surface layer consists of a mixture of elements of the core Li, M and O, and alumina, and wherein the electrolyte comprises the additive lithium difluorophosphate.

11 Claims, 7 Drawing Sheets

(51) Int. Cl.
  H01M 4/131 (2010.01)
  H01M 10/0567 (2010.01)
  H01M 10/0569 (2010.01)
  H01M 4/505 (2010.01)
  H01M 4/02 (2006.01)

(52) U.S. Cl.
  CPC ... H01M 10/0525 (2013.01); H01M 10/0567 (2013.01); H01M 10/0569 (2013.01); *H01M 2004/027* (2013.01); *H01M 2004/028* (2013.01)

(56) References Cited

U.S. PATENT DOCUMENTS

| | | |
|---|---|---|
| 2014/0054495 A1 | 2/2014 | Paulsen et al. |
| 2015/0099193 A1 | 4/2015 | Hamasaki et al. |
| 2015/0288033 A1 | 10/2015 | Lee et al. |
| 2016/0013517 A1* | 1/2016 | Nakazawa .......... H01M 10/052 429/200 |
| 2016/0118649 A1 | 4/2016 | Yamamoto et al. |
| 2016/0211553 A1* | 7/2016 | Ito ..................... H01M 10/0525 |
| 2016/0276659 A1 | 9/2016 | Choi et al. |
| 2017/0084916 A1* | 3/2017 | Oka ..................... H01M 4/525 |

FOREIGN PATENT DOCUMENTS

| | | | |
|---|---|---|---|
| CN | 103392251 | A | 11/2013 |
| DE | 112014000537 | T5 | 11/2015 |
| EP | 2851988 | A1 | 3/2015 |
| JP | 2007048711 | A * | 2/2007 |
| JP | 2014222607 | A | 11/2014 |
| JP | 2015069958 | A | 4/2015 |
| KR | 10-2015-0021809 | A | 3/2015 |
| KR | 10-2015-0063955 | A | 6/2015 |
| KR | 10-2015-0116330 | A | 10/2015 |

OTHER PUBLICATIONS

PCT, Written Opinion in International Application No. PCT/IB2017/051376 dated Jun. 30, 2017.

PCT, International Search Report in International Application No. PCT/IB2017/051376 dated Jun. 30, 2017.

* cited by examiner

LITHIUM ION BATTERY FOR AUTOMOTIVE APPLICATION

This application is a U.S. National Stage application of International Application No. PCT/IB2017/051376, filed on 9 Mar. 2017, which claims the benefit of European Patent Application No. 16163091.8, filed 31 Mar. 2016, the entire contents of which are all hereby incorporated herein by reference.

TECHNICAL FIELD AND BACKGROUND

This invention relates to secondary lithium ion batteries, containing a surface-treated positive electrode material and a non-aqueous liquid electrolyte, which are of interest for high voltage applications and for use in automotive batteries. More particularly, this positive electrode material comprises a surface modified lithium nickel manganese cobalt oxide compound, which shows improved cycling properties at elevated voltage (>4.2V), when used in combination with suitable electrolyte additives. An especially suitable electrolyte is an electrolyte which contains a difluorophosphate additive.

By introducing rechargeable lithium ion battery technology into the market of the hybrid electric vehicle (HEV) and plug-in hybrid electric vehicle (PHEV), there is an upsurge in demand of cathode materials with improved properties, such as high energy density, long cycling life, low price and so on. Conventional rechargeable lithium ion batteries use $LiCoO_2$ (LCO) as cathode material, mainly for portable electronic devices. There are however limitations to apply LCO to the automotive market. State-of-the-art LCO has been much improved to satisfy the requirement of high energy density and long cycling life, however, the price of LCO material cannot be cut down due to limited cobalt resources. Thus LCO is not really sustainable for the application of pure electrical vehicles (EV), HEV or PHEV.

An alternative to LCO are the so-called "NMC" cathode materials, which are derivatives of LCO, where Co ions are partially substituted by more abundant and environmental friendly transition metal ions such as Ni and Mn. "NMC" cathode materials have roughly the stoichiometry $Li_{1+a}M_{1-a}O_2$, where $0 \leq a \leq 0.1$, $M=Ni_xMn_yCo_z$ (x+y+z=1), and keep a similar crystal structure which is the ordered rock-salt structure of LCO, where the cations order into 2-dimensional Li and M layers. M may also be doped with other metals to improve the electrochemical properties of the cathode material. The space group is R-3M. For "NMC" cathode materials many different compositions are possible, depending on the substitution level of Co by Ni and Mn. They can be categorized and named after their nickel, manganese and cobalt content. Typical NMC-based materials are "NMC111" with $M=Ni_{1/3}Mn_{1/3}Co_{1/3}$, "NMC532" with $M=Ni_{0.5}Mn_{0.3}Co_{0.2}$, "NMC622" with $M=Ni_{0.6}Mn_{0.2}Co_{0.2}$ etc.

An NMC cathode material can roughly be understood as a solid state solution of $LiCoO_2$, $LiNi_{0.5}Mn_{0.5}O_2$ and $LiNiO_2$. In $LiNi_{0.5}Mn_{0.5}O_2$ Ni is divalent, in $LiNiO_2$ Ni is trivalent. At 4.3 V a nominal capacity is about 160 mAh/g for $LiCoO_2$ and $LiNi_{0.5}Mn_{0.5}O_2$, and 220 mAh/g for $LiNiO_2$. The reversible capacity of an NMC compound can be roughly estimated from the nominal capacities. For example NMC622 can be understood as 0.2 $LiCoO_2$+0.4 $LiNi_{0.5}Mn_{0.5}O_2$+0.4 $LiNiO_2$. Thus the expected capacity equals 0.2×160+0.4×160+0.4×220=184 mAh/g. Obviously the capacity increases with Ni content, so at the same voltage, NMC622 has a higher energy density than NMC532, NMC111, and definitely LCO. This means—when using NMC materials instead of LCO—less weight or volume of cathode material is required to achieve a certain energy. Also, the lower price of nickel and manganese compared to cobalt allows to reduce the cost of a NMC cathode per unit of energy. Thus, high Ni containing-NMC—like NMC622—is more preferable for the large battery markets of EV, HEV and PHEV.

Improving the energy density of the cathode is primordial for the automotive applications. As said before, an effective approach is to apply NMC materials with a high Ni content, for example NMC 622. Current technologies typically apply a charge voltage of 4.1 or even less. This only utilizes a relatively small part of the available lithium in the cathode active material. In general there is much concern about safety, calendar life and especially cycle stability that prevents the industry to increase the voltage further to 4.2V or beyond. An increase to for example 4.3V will increase the capacity per mass of cathode significantly, thus decreasing the cost and the weight of the battery, but the higher cut-off voltage necessitates stricter requirements regarding stability and safety. Besides, batteries in the automotive may need to withstand elevated temperatures above 45° C. and thus NMC cathode materials with a high Ni content have to cycle well at such temperatures. However, state of the art cathode materials exhibit issues like unsatisfactory cycle stability when an elevated voltage (above 4.2V) and high temperature (above 45° C.) is applied.

In the case of high Ni NMC it is difficult to achieve a good cycle stability when charged to high voltages, for instance 4.35V. The failure mechanism of NMC/graphite polymer cells during operation at a high charge cut-off voltage is still unclear. The prior art has tried to analyze the failure behavior and provided reasonable explanations as follows: in WO 2012/148894 A, it is mentioned that the electrolyte tends to react with the oxidized surface of the NMC cathode materials, resulting in irreversible losses and severe capacity fading. In J. Mater. Chem., 2011, 21, 17754, the dissolution of transition metals is believed to be the key contributor to the performance degradation of graphite/NMC full cells. This dissolution could originate from the side reactions between NMC and electrolyte. In U.S. Pat. No. 6,218,048, electrolyte decomposition during the charging process, or during the shelf life of the battery in its charged state (above 4V) is pointed out as the main cause for the failure of batteries. The decomposition is considerably accelerated at elevated temperatures.

Accordingly, to improve the cycle life of high Ni NMC/graphite full cells, effective solutions could be found by either modifying the high Ni NMC materials, or changing the electrolyte components. For the cathode materials the prior art mostly proposes surface modification or doping, as follows: in WO2011/054441, the authors propose a special LiF surface coating layer on NMC cathode materials, which significantly reduces the soluble base content and suppresses the gas generation of NMC polymer cells. The soluble base refers to impurities like $Li_2CO_3$ and LiOH. $Li_2CO_3$ and LiOH could either originate from remaining unreacted lithium precursors, which are usually $Li_2CO_3$ or LiOH, or from ion exchange reactions of the cathode with solvents, for example water which forms LiOH in the solvent and protons in the cathode. The soluble bases is a cause for a serious gas generation in full cells during operation which for example causes swelling of polymer cells. In J. Electrochem. Soc. 2012 160(9): A1451-A1456, Dahn et al. propose that an effective surface coating on the cathode or effective functional electrolyte additives could suppress the electrolyte oxidization and thus extend the cycle life of the batteries. In US2009/0087362, the authors provide a LiCoO$_2$ powder which is covered by an AlF$_3$ layer. This coated LiCoO$_2$ shows improved cycle stability in a LiCoO$_2$/Li half-cell when charged to 4.5V, at both 25° C. and 55° C.

For the electrolyte, some prior art proposes electrolyte additives, as follows: a publication in J. Electrochem. Soc., 2013, 162 (3), A330-A338 describes that vinylene carbonate (VC) improves the rate performance of a NMC111/graphite cell, but has no obvious benefit on capacity retention when cycled with charge cut-off voltage of 4.4V. In J. Electrochem. Soc., 2014, 161 (12), A1818-A1827, a systematic study of electrolyte additives in NMC111/graphite pouch cells concludes that vinylene carbonate (VC) combined with sultone and sulfur-containing additives can give cells with excellent storage properties and superior long term cycling at 55° C. US2009/0286135 A1 describes the use in general of lithium difluorophosphate in a non-aqueous electrolyte. US2012/0177818 A1 describes that an electrolyte including LiPO$_2$F$_2$ and a sultone-based compound may improve the cycle-life characteristics of the battery at room temperature (RT) and high temperature (HT), and suppress swelling.

Further prior art includes:
US2015/104704 (or EP2851988) disclosing an electrode assembly comprising a cathode, an anode and a separator, wherein the cathode comprises a lithium cobalt-based oxide, and a lithium nickel-based composite oxide having a coating layer over its surface, the coating layer being a reaction product of the lithium nickel-based composite oxide and a fluorine-containing polymer;
WO2014/115754 (also published as US2016/006030) disclosing a positive electrode active material for lithium secondary batteries comprising a lithium transition metal oxide Li$_{1+\alpha}$Ni$_x$Co$_y$Mn$_z$Ca$_\beta$M$_\gamma$O$_2$ (where $-0.05 \leq \alpha \leq 0.2$, x+y+z+β+γ≈1, $0.3 \leq x \leq 0.7$, $0.1 \leq y \leq 0.4$, $0.1 \leq z \leq 0.4$, $0.0002 \leq \beta \leq 0.0025$, $0.0002 \leq \beta+\gamma \leq 0.02$, and in a case where γ>0, M is absent or represents one, two or more elements selected from the group consisting of Na, Mg, Al, Ti, V, Cr, Zr, Nb, Mo, Hf, Ta and W; and
US2015/288033 disclosing a rechargeable lithium battery including a positive electrode including a positive active material, a negative electrode and an electrolyte including a lithium salt, an organic solvent and an additive. The positive active material includes a compound Li$_a$Ni$_x$Co$_y$Mn$_z$O$_2$ wherein 0<a≤2, 0.2≤x≤0.6, 0.2≤y≤0.6, 0.2<z≤0.6, and x+y+z=1, and the additive includes about 0.5 to about 2 parts by weight of lithium difluorophosphate (LiPO$_2$F$_2$) and about 0.5 to about 3 parts by weight of vinylene carbonate, based on 100 parts by weight of the organic solvent.

In view of the problems cited before, in order to employ high Ni NMC (such as NMC 622) full cells in high voltage applications, an effective surface modification of the high Ni cathode particles, as well as a suitable electrolyte system may be combined. An object of the present invention is to provide such an improved rechargeable lithium ion battery for automotive applications that allows to increase the charge voltage to 4.2, 4.3, 4.35V or even beyond.

SUMMARY

Viewed from a first aspect, the invention can provide the following product embodiments:

Embodiment 1

A rechargeable lithium ion battery comprising a positive electrode, a negative electrode and an electrolyte, the positive electrode comprising a lithium nickel manganese cobalt oxide-based powder with particles comprising a core and a surface layer, the core having a layered crystal structure comprising the elements Li, M and oxygen, wherein M has the formula M=(Ni$_z$(Ni$_{1/2}$Mn$_{1/2}$)$_y$Co$_x$)$_{1-k}$A$_k$, with $0.13 \leq x \leq 0.30$, $0.20 \leq z < 0.55$, x+y+z=1 and 0<k≤0.1, wherein A is at least one dopant and comprises Al, the lithium nickel manganese cobalt oxide-based powder having a molar ratio $0.95 \leq Li:M \leq 1.10$, wherein the surface layer consists of a mixture of elements of the core Li, M and O, and alumina, and wherein the electrolyte comprises the additive lithium difluorophosphate. The battery may be available before charging (which is also before cycling). In another embodiment, A can be, besides Al, one or more elements from the group consisting of Mg, Zr, W, Ti, Cr and V. A dopant, also called a doping agent, is a trace impurity element that is inserted into a substance (in very low concentrations), in this case in order to alter the electrical properties of the substance.

Embodiment 2

The rechargeable lithium ion battery wherein the surface layer of the lithium nickel manganese cobalt oxide-based powder particles further comprises LiF.

Embodiment 3

The rechargeable lithium ion battery wherein the core of the lithium nickel manganese cobalt oxide-based powder particles has an Al content of 0.3-3 mole %, wherein the surface layer is delimited by an outer and an inner interface, the inner interface being in contact with the core, and wherein the surface layer has an Al content that increases from the Al content of the core at the inner interface to at least 4 mole % at the outer interface, the Al content being determined by XPS.

Embodiment 4

The rechargeable lithium ion battery wherein the surface layer of the lithium nickel manganese cobalt oxide-based powder particles further comprises LiF, wherein the core of the lithium nickel manganese cobalt oxide-based powder particles has an Al content of 0.3-3 mole % and a F content of less than 0.05 mole %, wherein the surface layer has an Al content that increases from the Al content of the core at the inner interface to at least 10 mole % at the outer interface, and a F content that increases from less than 0.05 mole % at the inner interface to at least 3 mole % at the outer interface, the Al and F contents being determined by XPS.

Embodiment 5

The rechargeable lithium ion battery wherein the lithium nickel manganese cobalt oxide-based powder has a surface layer further comprises either one or more compounds from the group consisting of CaO, TiO$_2$, MgO, WO$_3$, ZrO$_2$, Cr$_2$O$_3$ and V$_2$O$_5$.

Embodiment 6

The rechargeable lithium ion battery wherein for the lithium nickel manganese cobalt oxide-based powder A=Al, k=0.005-0.013, x=0.20±0.02, y=0.40±0.05, z=0.40±0.05 and 1≤Li:M≤1.10.

Embodiment 7

The rechargeable lithium ion battery wherein the electrolyte comprises between 0.5 and 2 wt % of lithium difluorophosphate.

Embodiment 8

The rechargeable lithium ion battery of embodiment 7, wherein the electrolyte further comprises up to 2 wt % of vinyl ethylene carbonate.

Embodiment 9

The rechargeable lithium ion battery of embodiment 7, wherein the electrolyte further comprises up to 2 wt % of one or more additives selected from the group consisting of lithium bis(oxalate)borate, vinylene carbonate and 1,3-propene sultone.

Embodiment 10

The rechargeable lithium ion battery wherein the electrolyte comprises a solvent comprising either one or more of EC, DEC and EMC.

Embodiment 11

The rechargeable lithium ion battery described before, operating after charging to a final voltage >4.2V.

Further embodiments may be construed by combining each of the individual product embodiments described here above with one or more of the product embodiments described before it.

In the various product embodiments also, the thickness of the surface layer of the cathode powder may be more than 50 nm and less than 400 nm. The thickness of this surface layer is more than 50 nm, preferably more than 150 nm; and less than 400 nm, preferably less than 200 nm. It is clear that the outer interface of the surface layer corresponds to the actual surface of the particle. The inner interface may also be defined as the depth established with XPS where the Al content is at least 0.5 mole % higher than the constant doping level in the core of the material, also measured with XPS. If the surface layer thickness is less than 50 nm, it may be that the layer does not effectively reduce the content of the soluble bases LiOH and $Li_2CO_3$. If the layer is thicker than 400 nm, it may be that the intercalation and de-intercalation of Li is hindered too much, and the specific capacity of the powder is then lowered.

Viewed from a second aspect, the invention can provide the following method embodiment:

Embodiment 12

A method for preparing a rechargeable lithium ion battery according to one or more of the product embodiments, comprising the steps of:
  incorporating a lithium nickel manganese cobalt oxide-based powder in a positive electrode, the powder consisting of particles comprising a core and a surface layer, the core having a layered crystal structure comprising the elements Li, M and oxygen, wherein M has the formula $M=(Ni_z(Ni_{1/2}Mn_{1/2})_yCo_x)_{1-k}A_k$, with $0.13 \leq x \leq 0.30$, $0.20 \leq z < 0.55$, $x+y+z=1$ and $0 < k \leq 0.1$, wherein A is at least one dopant and comprises Al, the surface layer consisting of a mixture of elements of the core Li, M and O, and the lithium nickel manganese cobalt oxide-based powder having a molar ratio $0.95 \leq Li:M \leq 1.10$,
  providing a negative electrode,
  providing an electrolyte comprising the additive lithium difluorophosphate, and
  assembling the positive electrode, the negative electrode and the electrode in the battery.

Further method embodiments consist of incorporating in the positive electrode the different lithium nickel manganese cobalt oxide-based powders described in the product embodiments above.

Viewed from a third aspect, the invention can provide the following usage embodiment:

Embodiment 13

Use of a rechargeable lithium ion battery according to one or more of the product embodiments above, in either one of a portable computer, a tablet, a mobile phone, an electrically powered vehicle and an energy storage system. The particular use of the batteries according to the invention in EV, HEV or PHEV applications does not exclude that the same batteries offer advantages when used in the other applications named in embodiment 13.

DETAILED DESCRIPTION

This invention provides rechargeable lithium ion batteries (so-called full cells) containing high Ni-based cathode material and $LiPO_2F_2$-containing electrolyte, before cycling. The surface modified cathode powders according to the invention present an improved stability under high voltage cycling, so that these powders can be candidate NMC cathode materials for automotive applications. It is observed that uncycled full cells containing Al doped and Al surface enriched high Ni cathode materials and $LiPO_2F_2$-based electrolytes have an improved cycling stability during cycling in the voltage range of 3.0 V to 4.35 V at room temperature, when compared with full cells containing the same cathode material but a $LiPO_2F_2$-free electrolyte. Accordingly, there is a synergy between Al treated high Ni cathode materials and $LiPO_2F_2$-based electrolyte. Full cells containing such NMC cathode materials possess high stability in the Room Temperature (RT) and High Temperature (HT)-cycling and in High Temperature-storage, but only with the addition of $LiPO_2F_2$-based electrolyte additives according to the invention. Thus, the provided rechargeable lithium ion batteries of this invention allow for stable cycling under high voltage conditions.

It is believed that the addition of $LiPO_2F_2$ to the electrolyte and the Al enriched layer at the surface of the cathode together more efficiently prevent side reactions and gas generation in the NMC-full cell system. A typical electrolyte salt such as $LiPF_6$ tends to decompose and form side-products at high voltage, including strong acids, which results in a reaction with the soluble base content on the surface of the NMC cathode material, and solvent decomposition. These acids would e.g. attack active NMC622 material and form a SEI layer on the surface of the NMC particles. The addition of $LiPO_2F_2$ to the electrolyte system may hinder or reduce the decomposition and side reactions of $LiPF_6$ and further prevent that byproducts attack the high Ni NMC particles. It is essential that the electrolyte contains $LiPO_2F_2$, however other electrolyte additives like VC, LiBOB, PRS, VEC are known in the prior art and can still further improve the battery performance. In Journal of the Electrochemical Society, 2014, 161 (4) A506, Dahn et al. for example teach that a combination of electrolyte additives can have a positive effect exceeding the sum of the positive contributions of the single additive and thus bringing a synergetic effect.

The present invention also finds that uncycled full cells containing Al treated high Ni NMC cathode powders show much improved storage properties at high temperature when compared to full cells containing Ca doped or bare high Ni powders, especially in the case of using $LiPO_2F_2$-based electrolyte. Thus, it can be concluded that the synergetic effect between Al treated high Ni cathode materials and $LiPO_2F_2$-based electrolyte enhances the stability of full cells at high temperature.

According to the present invention, the Al surface treated high Ni NMC cathode powders exhibit superior properties when applied in Li-ion batteries. This is attributed to the Al gradient within the surface layer and may be further enhanced by the presence of a fluor gradient in the surface layer. The existence of the Al gradient can help to improve the cycle stability when the cathode materials are charged to a high voltage such as 4.35V. The F gradient in the coating layer on the other hand helps to reduce the amount of soluble base and eventually improves the storage properties of a full cell at elevated temperature.

The surface modified NMC622 powders according to the invention may have a core and a surface layer that may be an annealed coating layer. In some embodiments, the surface layer is delimited by an outer and an inner interface, the inner interface being in contact with the core. The core may have an Al content more than 0.3 mole % but less than 3.0 mole %, and a F content less than 0.05 mole %, as determined by XPS. In one embodiment, the surface layer has an Al content that increases continuously from the Al content of the core at the inner interface to more than 4 mole % at the outer interface, and preferably more than 6 mole %. In another embodiment, the surface layer has an Al content that increases continuously from the Al content of the core at the inner interface to more than 10 mole % at the outer interface, and preferably more than 12 mole %; and has a F content that increases continuously from less than 0.05 mole % at the inner interface to at least 3 mole % at the outer interface, preferably at least 5 mole % at the outer interface. The concentration of the different elements in the surface layer and the outer part of the core can be determined using X-ray photoelectron spectroscopy (XPS).

In another embodiment of this invention, doping elements can be, besides Al, one or more elements from the group of Ca, Mg, Zr, W, Ti, Cr and V. The source of doping element is preferably a compound selected from the group consisting of a metal oxide, for example—besides $Al_2O_3$—$TiO_2$, MgO, $WO_3$, $ZrO_2$, $Cr_2O_3$, $V_2O_5$ and mixtures thereof. The preferred source of Al is a nano-scale alumina powder, for example fumed alumina. The alumina can be obtained by precipitation, spray drying, milling, etc. In one embodiment fumed alumina or surface treated fumed alumina is used. Fumed alumina nanoparticles are produced in high temperature hydrogen-air flames and are used in several applications that involve products of everyday use.

As mentioned before, in one embodiment, the doping element includes Al and F. The source of F may be a fluorine-containing polymer. A typical example for such a polymer is a PVDF homopolymer or PVDF copolymer (such as HYLAR® or SOLEF® PVDF, both from Solvay SA, Belgium). Another known PVDF based copolymer is for example a PVDF-HFP (hexa-fluoro propylene). Such polymers are often known under the name "Kynar®". Teflon—or PTFE—could also be used as polymer. During the sintering step, the fluorine-containing polymer—which is free of Li—decomposes in contact with the core material, as described in WO2011/054441. The polymer is completely decomposed and lithium fluoride is formed, which is found in the surface layer of the particles. The LiF originates from the reaction of the decomposing polymer with lithium containing surface base of the lithium transition metal oxides. It can be speculated that LiF in the surface layer protects the Li in the particle, thus preventing it from reacting with carbon to form $Li_2CO_3$. The obtained surface layer has the following function: the thin layer comprising LiF and replaces the reactive surface base layer, thus reducing the base content practically to zero at the core's surface, and improving the overall safety. In the present invention, it can be verified that the surface layer is a mixture of elements of the core, LiF and $Al_2O_3$.

Surface-modified high Ni NMC cathode powders according to the invention may be used in positive electrodes in a full cell configuration which can be evaluated at room temperature (RT) and elevated temperature (HT) in cycling tests at 25° C. and 45° C., respectively. In one embodiment, 1.5 wt % of $LiPO_2F_2$ (lithium difluorophosphate) serves as electrolyte additive, and EC (ethylene carbonate)/DEC (diethyl carbonate)/EMC (Ethylmethylcarbonate) are employed as solvent with a weight ratio of 25.5:29.6:29.6. Al treated NMC622—with or without fluorine gradient—may be the active material of the positive electrode of the full cell. The RT and HT cycling test of such a full cell shows excellent cycling stability and a good storage property. Compared with full cells using Ca doped or bare NMC622 as cathode materials, it is discovered that full cells containing Al treated NMC622 cathode materials have a much better cycling life during cycling in the voltage range of 3.0 V to 4.5 V at room temperature, especially with $LiPO_2F_2$-containing electrolyte.

In another embodiment, the electrolyte of the full cell includes 1 wt % of $LiPO_2F_2$ (lithium difluorophosphate) and 1 wt % of VEC (vinyl ethylene carbonate) as electrolyte additives, and EC (ethylene carbonate)/DEC (diethyl carbonate)/EMC (Ethylmethylcarbonate) as solvent with a weight ratio of 25.5:29.6:29.6. Al and F surface modified NMC622 is the active material of the positive electrode of the full cell. The RT and HT cycling tests show that the cycling stability of this full cell is better than that of a full cell with only the $LiPO_2F_2$ additive. The benefit brought by the addition of $LiPO_2F_2$ together with VEC is not observed in such full cells, where Ca doped or bare-NMC622 is the active material of the positive electrode. Accordingly, further addition of VEC to $LiPO_2F_2$-based electrolyte has the benefit to increase the capacity retention of Al treated NMC622-based cells during cycling at high voltage.

This invention discovers the synergetic effect between Al surface modified NMC622 cathode materials and $LiPO_2F_2$-containing electrolyte, which allows to achieve excellent stability of cells during RT and HT cycling at high voltage. Thus, rechargeable lithium ion battery devices according to this invention have a suitable performance for automotive application especially allowing for a long cycle life.

The following description details the preparation of the cathode materials in the Examples:

Preparation of NMC622

(a) Preparation of a NMC622 core: lithium hydroxide and a mixed Ni—Mn—Co oxy-hydroxide are homogeneously blended in a vertical single-shaft mixer by a dry powder mixing process. The blend ratio is targeted to obtain $Li_{1.01}(Ni_{0.4}(Ni_{1/2}Mn_{1/2})_{0.4}Co_{0.2})_{0.99}O_2$, which can be easily verified by an analysis technique such as ICP. The mixture is then sintered in a tunnel furnace in an oxidizing atmosphere. The sintering temperature is >900° C. and the dwell time is ~10 hrs. Dry air is used as an oxidizing gas. After sintering, the sample is milled in a grinding machine to a mean particle size of around 12 μm.

(b) Al doping and alumina surface enrichment: NMC 622 powder from step (a) is surface modified by aluminum as described in Example 1 (step (d)) of WO2016/116862, this co-pending application being incorporated herein by reference: 1 kg of the $Li_{1.01}(Ni_{0.4}(Ni_{1/2}Mn_{1/2})_{0.4}Co_{0.2})_{0.99}O_2$ powder from step (a) is filled into a mixer (in the example a 2 L Henschel type Mixer) and 2 g of fumed alumina ($Al_2O_3$) nano-powder is added as well. After homogeneously mixing (usually 30 mins at 1000 rpm), the mixture is sintered in a box furnace in an oxidizing atmosphere. The sintering temperature is 700° C. and the dwell time is ~5 hrs. Dry air is used as an oxidizing gas. It can be verified that after the surface modification Al is doped in the lithium metal oxide (core) and XPS measurements show a gradient that is established at the surface with increasing Al content, besides the surface layer being enriched with aluminum in the form of alumina. After this step the material could be represented by the overall formula $Li_{1.01}((Ni_{0.4}(Ni_{1/2}Mn_{1/2})_{0.4}Co_{0.2})_{0.996}Al_{0.004})_{0.99}O_2$.

(c) Alumina and LiF surface modification: powder obtained from process (b) is processed according to the procedure described in Example 1 (step (e)) of co-pending application of WO2016/116862: 1 kg of powder obtained from process (b) is filled into a mixer (in the example a 2 L Henschel type Mixer), 2 g of fumed alumina ($Al_2O_3$) nano-powder and 3 g polyvinylidene fluoride (PVDF) powder is added as well. After homogeneously mixing (usually 30 mins at 1000 rpm), the mixture is sintered in a box furnace in an oxidizing atmosphere. The sintering temperature is 375° C. and the dwell time is ~5 hrs. Dry air is used as an oxidizing gas. The surface layer established in step (b) is not creating a barrier for the PVDF to react with Li present at the inner surface, and to form LiF. It can be verified that after the second sintering step the surface layer is a mixture of elements of the core, LiF and $Al_2O_3$. The final Al content is 0.8 mole % (as can be determined by ICP).

Figure 1:
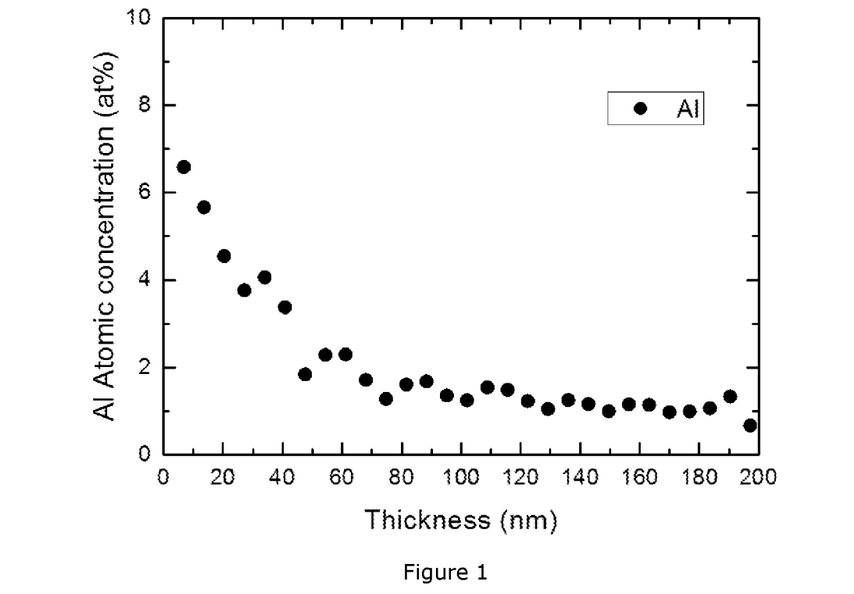
FIG. 1: XPS analysis of the surface of the "A-NMC622" material.
Figure 2:
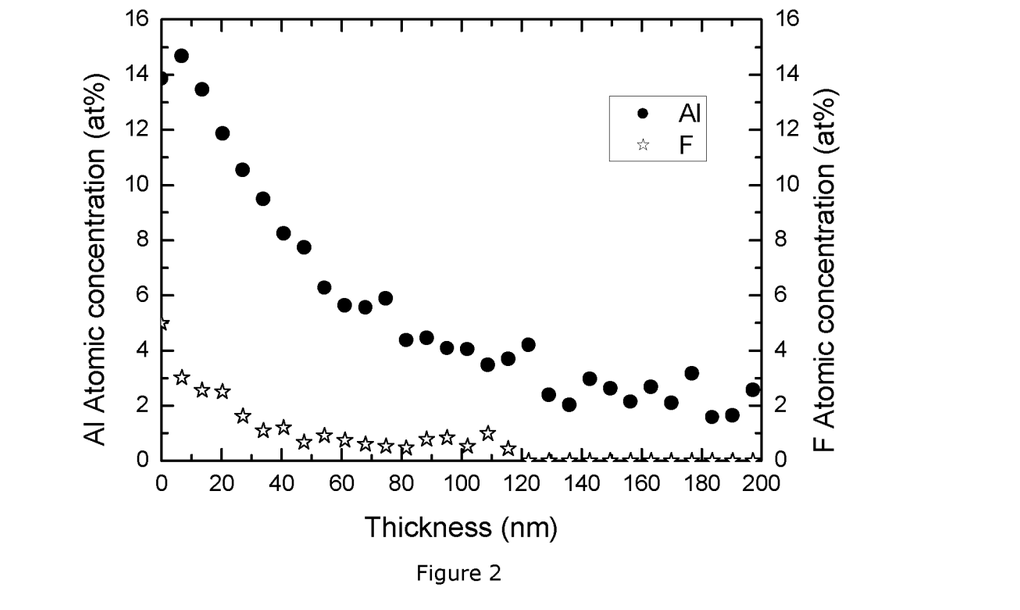
FIG. 2: XPS analysis of the surface of the "AF-NMC622" material.

A positive electrode material with the formula $Li_{1.01}((Ni_{0.4}(Ni_{1/2}Mn_{1/2})_{0.4}Co_{0.2})_{0.99}O_2$ is manufactured through the process (a) without any further treatment and referred to as "Bare-NMC622" hereafter. A positive electrode material with the formula $Li_{1.00}((Ni_{0.4}(Ni_{1/2}Mn_{1/2})_{0.4}Co_{0.2})_{0.996}Al_{0.004})_{0.99}O_2$ is manufactured through the process (a) and (b), and referred to as "A-NMC622" hereafter. The XPS analysis of the surface of the "A-NMC622" material is shown in FIG. 1, where the gradient, surface and core content of Al are clearly visible. A positive electrode material with the formula $Li_{1.01}((Ni_{0.4}(Ni_{1/2}Mn_{1/2})_{0.4}Co_{0.2})_{0.992}Al_{0.008})_{0.99}O_{1.991}F_{0.009}$ is manufactured through the process (a), (b) and (c), and referred to as "AF-NMC622" hereafter. The XPS analysis of the surface of the "AF-NMC622" material is shown in FIG. 2, where the gradients of Al and F are clearly visible, together with their surface and core content.

Preparation of Ca-Doped NMC622

Lithium hydroxide, calcium oxide and a mixed Ni—Mn—Co oxy-hydroxide are homogeneously blended in a vertical single-shaft mixer by a dry powder mixing process. The blend ratio is targeted to obtain $Li_{1.01}(Ni_{0.4}(Ni_{1/2}Mn_{1/2})_{0.4}Co_{0.2}Ca_{0.001})_{0.99}O_2$, which can be easily verified by an analysis technique such as ICP. The mixture is then sintered in a tunnel furnace in an oxidizing atmosphere. The sintering temperature is >900° C. and the dwell time is ~10 hrs. Dry air is used as an oxidizing gas. After sintering, the sample is milled in a grinding machine to a mean particle size of around 12 μm. The final obtained material is referred to "Ca-NMC622" hereafter. The addition of Ca in the cathode material is known to realize an outstanding battery capacity (for example a high energy density) and a high reliability at the time of overcharge, as is disclosed e.g. in JP2014-143108.

The following description details the preparation of the full cells in the Examples:

A) Full Cell Making 650 mAh pouch-type cells are prepared by the following two steps: I. Slurry making and coating and II. Full cell assembly.

I. Slurry Making and Coating

A slurry is prepared by mixing 700 g of NMC cathode material with NMP, 47.19 g of super P® (conductive carbon black of Timcal) and 393.26 g of 10 wt % PVDF based binder in NMP solution. The mixture is mixed for 2.5 hrs in a planetary mixer. During mixing additional NMP is added. The mixture is transferred to a Disper mixer and mixed for 1.5 hrs under further NMP addition. A typical total amount of NMP used is 423 g. The final solid content in the slurry is about 65 wt %. The slurry is transferred to a coating line. Double coated electrodes are prepared. The electrode surface is smooth. The electrodes are compacted by a roll press to achieve an electrode density of about 3.2 g/cm³. The electrodes are used to prepare pouch cell type full cells as described hereafter.

II. Full Cell Assembly

For full cell testing purposes, the prepared positive electrodes (cathode) are assembled with a negative electrode (anode) which is typically a graphite type carbon, and a porous electrically insulating membrane (separator). The full cell is prepared by the following major steps:

a. Electrode slitting: after NMP coating the electrode active material might be slit by a slitting machine. The width and length of the electrode are determined according to the battery application.

b. Attaching the tabs: there are two kinds of tabs. Aluminum tabs are attached to the positive electrode (cathode), and copper tabs are attached to the negative electrode (anode).

c. Electrode drying: the prepared positive electrode (cathode) and negative electrode (anode) are dried at 85° C. to 120° C. for 8 hrs in a vacuum oven.

d. Jellyroll winding: after drying the electrode a jellyroll is made using a winding machine. A jellyroll consists of at least a negative electrode (anode) a porous electrically insulating membrane (separator) and a positive electrode (cathode).

e. Packaging: the prepared jellyroll is incorporated in a 650 mAh cell with an aluminum laminate film package, resulting in a pouch cell. Further, the jellyroll is impregnated with the electrolyte according to this invention. The quantity of electrolyte is calculated in accordance with the porosity and dimensions of the positive and negative electrode, and the porous separator. Finally, the packaged full cell is sealed by a sealing machine.

B) Full Cell Cycling Test

The following description details the analysis methods in the Examples: In the various embodiments of the modified cathode powders, the thickness of the surface layer may be more than 50 nm and less than 400 nm. The thickness of the surface layer is determined by XPS measurement. A sputtering rate in $SiO_2$: 6.0 nm/minute is applied to calculate the depth/thickness. The thickness here is obtained by the sputtering time multiplied by the (reference) sputtering rate in $SiO_2$. During the XPS measurement, it is difficult to obtain the sputtering rate of measured objectives. A typical way is to normalize the thickness by using a standard sputtering rate (in $SiO_2$ here) for all samples. Therefore, it is not necessary true that the thickness calculated here is the same as could be obtained by other spectra methods, for example, Scanning Electron Microscopy (SEM). Known techniques such as ICP give the average composition of the powder. It is known that ICP gives a more accurate average measurement than XPS, however, for descriptions of the properties of the surface layer, such as element distribution with different layer thickness, XPS can provide accurate qualitative and quantitative data. Practically, the measurements are carried out in a Quantera SXM™ from ULVAC-PHI (Q2). The measurements are performed using monochromatic Al-Kα-radiation and a spot size of 100 μm scanning across an area of 1200×500 μm (High Sensitivity Mode). The measurement angle Θ is 450; at this setting the information depth is approximately 7 nm. By means of wide-scan measurements the elements present at the surface are identified. Accurate narrow-scans are performed to determine the precise surface composition. Concentration—depth profiles are determined by alternating measurements and ion bombardment (Argon ions, Vi=4 kV, raster 3×3 mm, sputter rate in $SiO_2$: 6.0 nm/minute).

Electrochemical properties: the full cell is cycled at 25° C. (=RT) and 45° C. (=HT) using Toscat-3100 computer-controlled galvanostatic cycling stations (Toyo) between 3.0V and 4.35V under CC/CV (constant current/constant voltage) mode at 1 C rate (corresponding to the current which discharges a charged cell within 1 hr).

The invention is further illustrated in the following examples:

Example 1: A-NMC622 and Electrolyte 1

This example presents a full cell (prepared as explained before), where the electrolyte consists of:

(a) a non-aqueous solvent with electrolyte salt: ethylene carbonate (EC)/diethyl carbonate (DEC)/Ethylmethylcarbonate (EMC)/lithium hexafluorophosphate ($LiPF_6$) with a weight ratio of 25.5:29.6:29.6:13.3; and (b) electrolyte additives: 0.5 wt % of lithium bis(oxalato) borate ($LiB(C_2O_4)_2$, LiBOB), 1 wt % of vinylene carbonate (VC), 0.5 wt % of propene sultone (PRS) and 1 wt % of lithium difluorophosphate ($LiPO_2F_2$).

The above prepared electrolyte system is labelled Electrolyte 1. The full cell comprises cathode active material "A-NMC622". The above prepared 650 mAh pouch-type battery is labelled Cell 1.

Counter Example 2: A-NMC622 and Electrolyte 1 without $LiPO_2F_2$

This example presents a full cell prepared through the same procedure as Cell 1, without the addition of 1 wt % of lithium difluorophosphate ($LiPO_2F_2$). This electrolyte is commercialized by Panax Etec. The prepared 650 mAh pouch-type battery is labelled Cell 2.

Example 3: AF-NMC622 and Electrolyte 1

This example presents a full cell prepared through the same procedure as Cell 1, but the cathode material is composed of "AF-NMC622" as described before. The prepared 650 mAh pouch-type battery is labelled Cell 3.

Counter Example 4: AF-NMC622 and Electrolyte 1 without $LiPO_2F_2$

This example presents a full cell prepared through the same procedure as Cell 2, but the cathode material is composed of "AF-NMC622". The prepared 650 mAh pouch-type battery is labelled Cell 4.

Example 5: AF-NMC622 and Electrolyte 2

This example presents a rechargeable lithium ion full cell prepared as explained before, with the electrolyte consisting of:

(a) a non-aqueous solvent combined with electrolyte salt: ethylene carbonate (EC)/diethyl carbonate (DEC)/Ethylmethylcarbonate (EMC)/lithium hexafluorophosphate ($LiPF_6$) with a weight ratio of 25.5:29.6:29.6:13.3; and (b) an electrolyte additive: 1.5 wt % of lithium difluorophosphate ($LiPO_2F_2$); The above prepared electrolyte system is labelled Electrolyte 2. The cell further comprises the cathode active material "AF-NMC622". The above prepared 650 mAh pouch-type battery is labelled Cell 5.

Example 6: AF-NMC622 and Electrolyte 2 with PRS

This example presents a full cell prepared through the same procedure as Cell 5, with the addition of 0.5 wt % of 1,3-propene sultone (PRS). The prepared 650 mAh pouch-type battery is labelled Cell 6.

Example 7: AF-NMC622 and Electrolyte 2 with Addition of LiBOB

This example presents a full cell prepared through the same procedure as Cell 5, with the addition of 0.5 wt % of Lithium Bis(oxalate)borate (LiBOB). The prepared 650 mAh pouch-type battery is labelled Cell 7.

Example 8: AF-NMC622 and Electrolyte 2 with Addition of LiBOB and PRS

This example presents a full cell prepared through the same procedure as Cell 5, but the electrolyte additives are 1 wt % of lithium difluorophosphate (LiPO$_2$F$_2$), 0.5 wt % of Lithium Bis(oxalate)borate (LiBOB) and 0.5 wt % of 1,3-propene sultone (PRS). The prepared 650 mAh pouch-type battery is labelled Cell 8.

Example 9: AF-NMC622 and Electrolyte 2 with Addition of VEC

This example presents a full cell prepared through the same procedure as Cell 5, but the electrolyte additives are 1 wt % of lithium difluorophosphate (LiPO$_2$F$_2$) and 1 wt % of Vinyl Ethylene carbonate (VEC). The prepared 650 mAh pouch-type battery is labelled Cell 9.

Counter Example 10: AF-NMC622 and Electrolyte 2 without LiPO$_2$F$_2$

This example presents a full cell prepared through the same procedure as Cell 5, without addition of LiPO$_2$F$_2$. The prepared 650 mAh pouch-type battery is labelled Cell 10.

Counter Example 11: Ca-NMC622 and Electrolyte 1

This example presents a full cell prepared through the same procedure as Cell 1, but the cathode material is composed of "Ca-NMC622" as described before. The prepared 650 mAh pouch-type battery is labelled Cell 11.

Counter Example 12: Bare-NMC622 and Electrolyte 1

This example presents a full cell prepared through the same procedure as Cell 1, but the cathode material is composed of "Bare-NMC622" as described before. The prepared 650 mAh pouch-type battery is labelled Cell 12.

Counter Example 13: Bare-NMC622 and Electrolyte 1 without LiPO$_2$F$_2$

This example presents a full cell prepared through the same procedure as Cell 2, but the cathode material is composed of "Bare-NMC622". The prepared 650 mAh pouch-type battery labelled Cell 13.

Table 1 summarizes the information on electrolyte additives and cathode materials in each cell.

TABLE 1

Cathode materials and Electrolyte compositions in Cells 1 to 13

| Cell ID | LiPO$_2$F$_2$ (wt %) | VC (wt %) | LiBOB (wt %) | PRS (wt %) | VEC (wt %) | Cathode material |
|---|---|---|---|---|---|---|
| Cell 1 | 1 | 1 | 0.5 | 0.5 | — | A-NMC622 |
| Cell 2 | — | 1 | 0.5 | 0.5 | — | |
| Cell 3 | 1 | 1 | 0.5 | 0.5 | — | AF-NMC622 |
| Cell 4 | — | 1 | 0.5 | 0.5 | — | |
| Cell 5 | 1.5 | — | — | — | — | |
| Cell 6 | 1.5 | — | — | 0.5 | — | |
| Cell 7 | 1.5 | — | 0.5 | — | — | |
| Cell 8 | 1 | — | 0.5 | 0.5 | — | |
| Cell 9 | 1 | — | — | — | 1 | |
| Cell 10 | — | — | — | — | — | |
| Cell 11 | 1 | 1 | 0.5 | 0.5 | — | Ca-NMC622 |
| Cell 12 | 1 | 1 | 0.5 | 0.5 | — | Bare-NMC622 |
| Cell 13 | — | 1 | 0.5 | 0.5 | — | |

Figure 3:
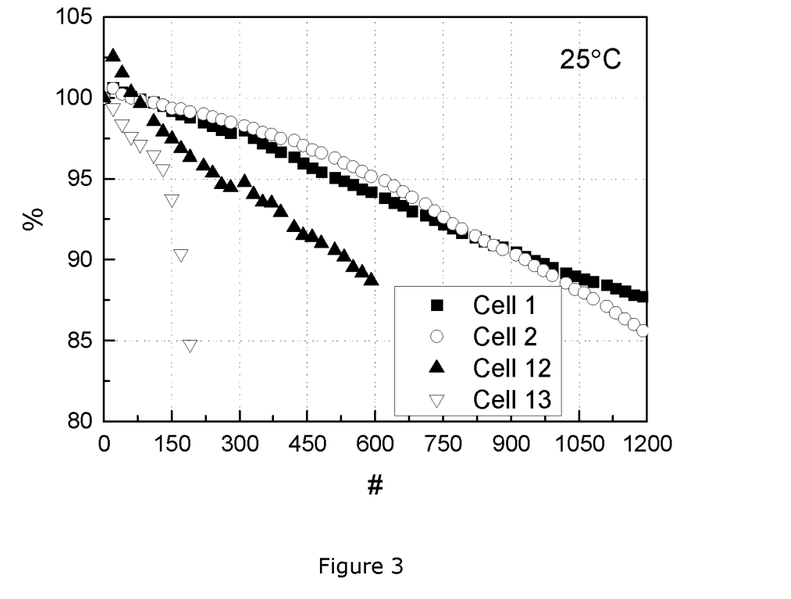
FIG. 3: capacity retention of Cells 1, 2, 12, 13 during cycling at room temperature.

Discussion of the Examples by comparison of Cells 1, 2, 12 and 13: this discussion proves the synergetic effect of cathode material "A-NMC622" and electrolyte containing LiPO$_2$F$_2$, on improving the cycling stability of a battery at high voltage. Cells 1 comprises "A-NMC622" and electrolyte system "Electrolyte 1" containing LiPO$_2$F$_2$. Cell 2 uses the same cathode material but an electrolyte system without LiPO$_2$F$_2$. Cell 12 contains the same electrolyte system as Cell 1, but has a different cathode material "Bare-NMC622" that is NMC622 without any surface or doping treatment. Cell 13 serves as reference sample, comprising "Bare-NMC622" and "Electrolyte 1" without LiPO$_2$F$_2$. FIG. 3 shows the capacity retention of those cells during cycling in a voltage range of 4.35 to 3.0V (represented as the plots of capacity retention versus cycle number) at room temperature. It is observed that Cells 2 and 12 have a better cycling performance than reference Cell 13, which proves that cathode material "A-NMC622" is more stable than "Bare-NMC622" during cycling, and also that the addition of LiPO$_2$F$_2$ in the electrolyte enhances the stability of the cells. It can be seen moreover that Cell 1 has an even better cyclability than Cells 2 and 12, showing the synergetic effect of "A-NMC622" and LiPO$_2$F$_2$ based electrolyte on cycling performance.

Figure 4:
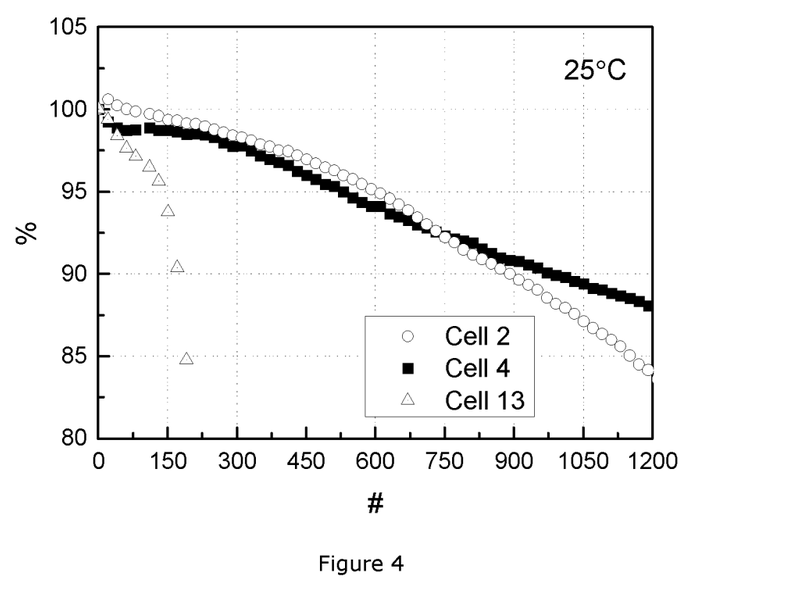
FIG. 4: capacity retention of Cells 2, 4, 13 during cycling at room temperature.
Figure 5:
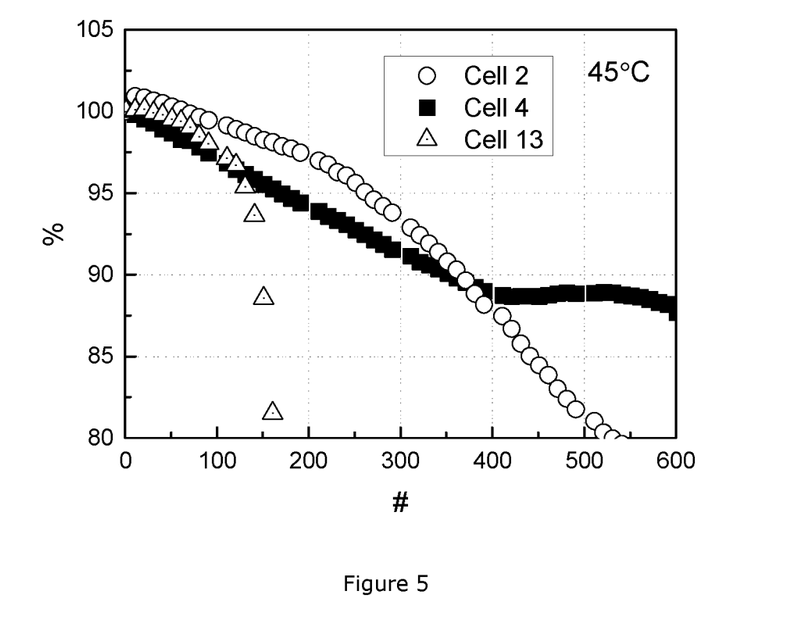
FIG. 5: capacity retention of Cells 2, 4, 13 during cycling at 45° C.

Discussion of the Examples by comparison of Cells 2, 4 and 13: Cells 2, 4 and 13 contain the same electrolyte system "Electrolyte 1" without LiPO$_2$F$_2$, but they contain a different cathode material. Cell 2 uses "A-NMC622", Cell 4 employs "AF-NMC622" and Cell 13 uses "Bare-NMC622". FIGS. 4 and 5 show the capacity retention of those cells during cycling in a voltage range of 4.35 to 3.0V (represented as the plots of capacity retention versus cycle number) at room temperature and 45° C. respectively. It is observed that the capacity retention in Cell 4 is higher than in Cells 2 & 13, which proves that Al and F treatment on NMC622 improves the cycling stability.

Figure 6:
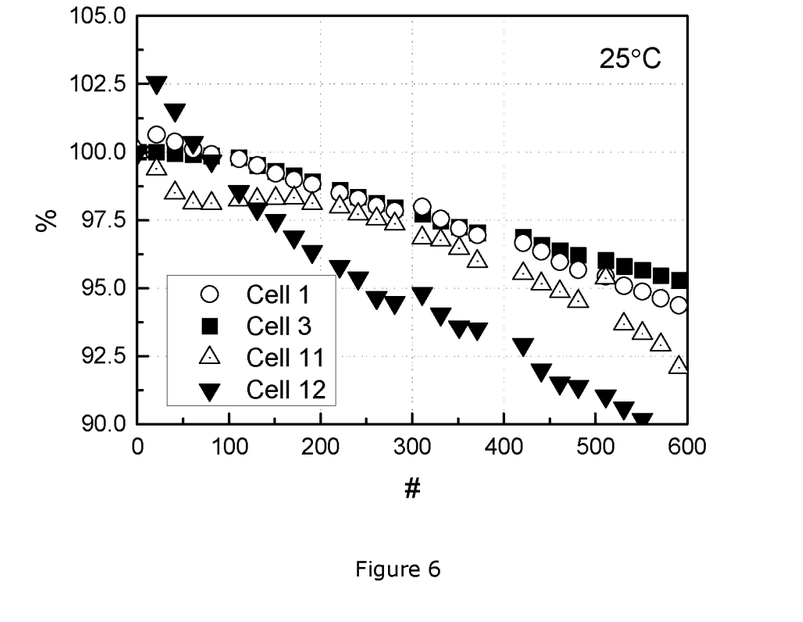
FIG. 6: capacity retention of Cells 1, 3, 11 and 12 during cycling at room temperature.
Figure 7:
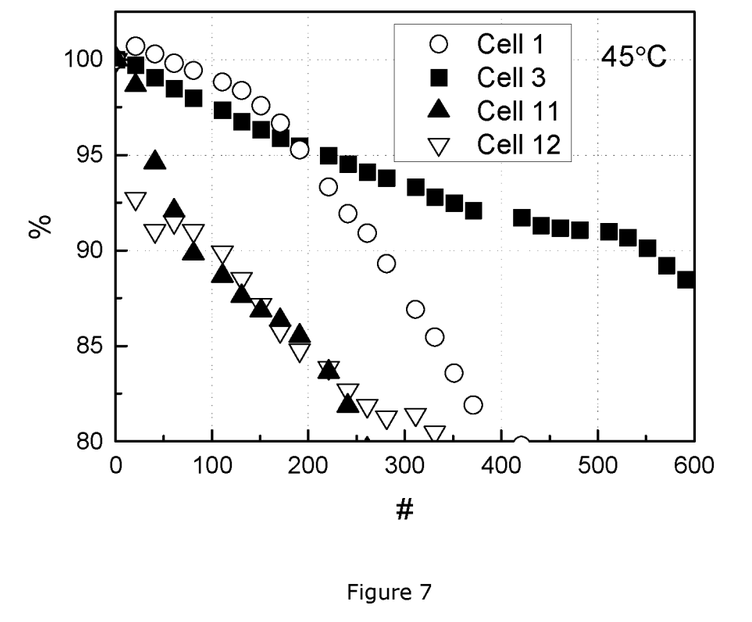
FIG. 7: capacity retention of Cells 1, 3, 11 and 12 during cycling at 45° C.

Discussion of the Examples by comparison of Cells 1, 3, 11 and 12: Cells 1, 3, 11 and 12 contain the same electrolyte system "Electrolyte 1" with LiPO$_2$F$_2$, but they contain a different cathode material. Cell 1 uses "A-NMC622", Cell 3 uses "AF-NMC622", Cell 11 employs "Ca-NMC622" and Cell 12 uses "Bare-NMC622". FIGS. 6 and 7 show the capacity retention of those cells during cycling at room temperature and 45° C., respectively. It is observed that the capacity retention in Cell 3 is higher than in Cell 1, and much higher than in Cells 11 and 12, which proves that Al-treated NMC622 is more stable than Ca doped NMC622 and bare NMC622 during the cycling of cells containing $LiPO_2F_2$. This result is analogous to the comparison of Cells 2, 4 & 13 that use "Electrolyte 1" without $LiPO_2F_2$.

Figure 8:
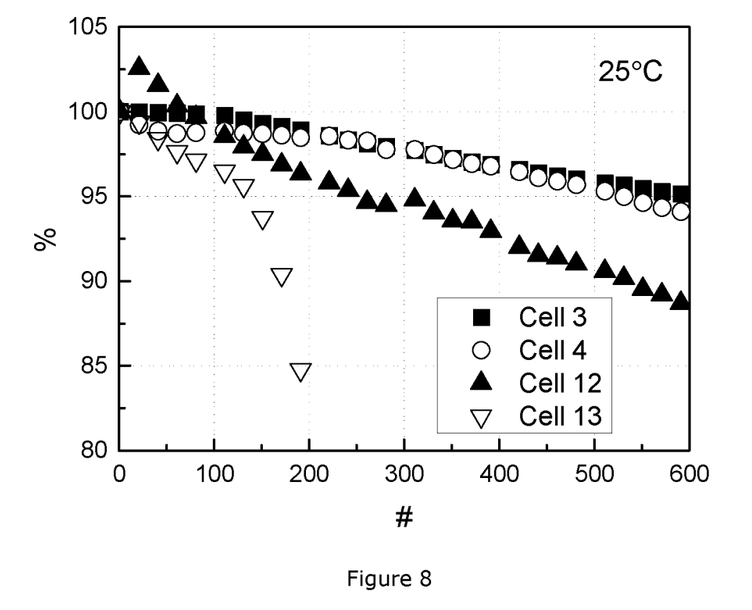
FIG. 8: capacity retention of Cells 3, 4, 12 and 13 during cycling at room temperature.
Figure 9:
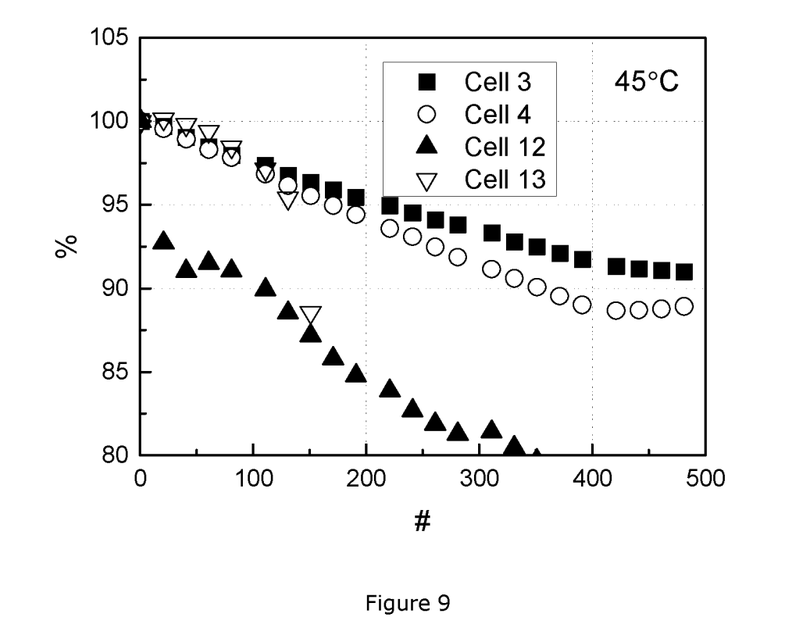
FIG. 9: capacity retention of Cells 3, 4, 12 and 13 during cycling at 45° C.

Discussion of the Examples by comparison of Cells 3, 4, 12 and 13: this discussion proves the synergetic effect of cathode material "AF-NMC622" and electrolyte containing $LiPO_2F_2$ on improving cycling stability of a battery at high voltage. Cell 3 comprises "AF-NMC622" and the electrolyte system "Electrolyte 1" containing $LiPO_2F_2$. Cell 4 uses the same cathode material as Cell 3 and a comparable electrolyte however without $LiPO_2F_2$. Cell 12 contains the same electrolyte system as Cell 3, but has a different cathode material "Bare-NMC622" that is NMC622 without any surface or doping treatment. Cell 13 serves as reference sample, comprising "Bare-NMC622" and "Electrolyte 1" without $LiPO_2F_2$. FIGS. 8 and 9 show the capacity retention of those cells during cycling at room temperature and 45° C., respectively. At both temperatures, it is observed that Cells 4 and 12 show the better cycling performance compared with reference sample of Cell 13, which proves that cathode material "AF-NMC622" is more stable than "Bare-NMC622" during cycling, and the addition of $LiPO_2F_2$ in the electrolyte also enhances the stability of cells. It can moreover be seen that Cell 3 has an even better cyclability compared to Cells 4 and 12, showing the synergetic effect of "AF-NMC622" and $LiPO_2F_2$ based electrolyte on cycling performance.

Figure 10:
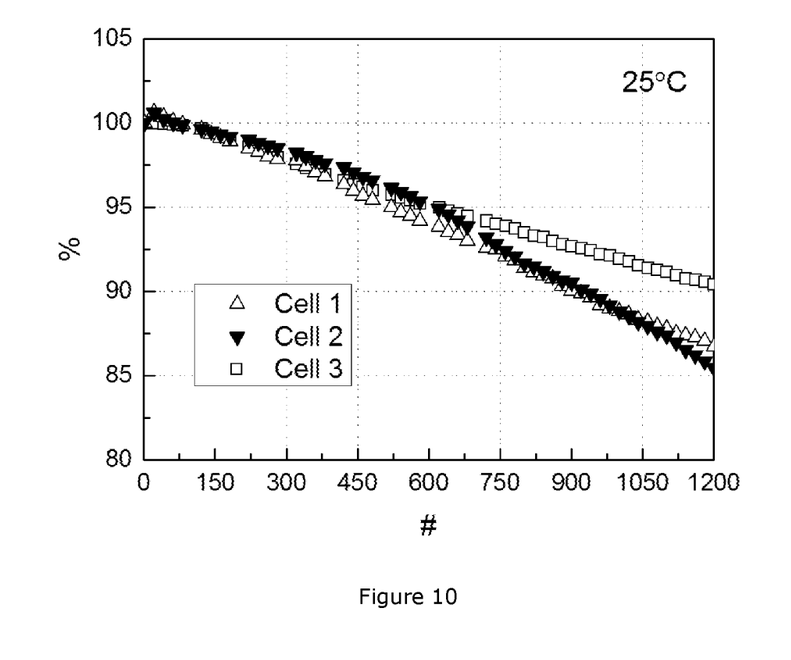
FIG. 10: capacity retention of Cells 1-3 during cycling at room temperature.

Discussion of the Examples by Comparison of Cells 1, 2 & 3:

The electrolyte composition of Cells 1 to 3 is listed in Table 1. In Cells 1 and 2, "A-NMC622" is the active material of the positive electrode. In Cell 3, "AF-NMC622" is used to make a positive electrode. As to Cells 1 and 3, the electrolyte is composed of $LiPO_2F_2$ and the electrolyte of Cell 2. FIG. 10 shows the capacity retention of Cells 1 to 3 during cycling tests at room temperature. Compared with a cell containing the commercial electrolyte (Cell 2), cells with addition of $LiPO_2F_2$ (Cells 1 and 3) present a better cycling performance, which demonstrates that the positive effect of $LiPO_2F_2$ on cycling stability is not only obtained for "AF-NMC622"-based full cell, but also for "A-NMC622". Thus, in general a $LiPO_2F_2$-based electrolyte stabilizes the cycling performance of full cells at high voltage when cathode materials utilize Al-treated NMC622. Compared to Cell 2, Cell 1 has an improved performance by the positive effect of the $LiPO_2F_2$-based electrolyte. The even more superior results of Cell 3 show that there is a synergetic effect between the application of the "AF-NMC622" treatment and the $LiPO_2F_2$-based electrolyte.

Figure 11:
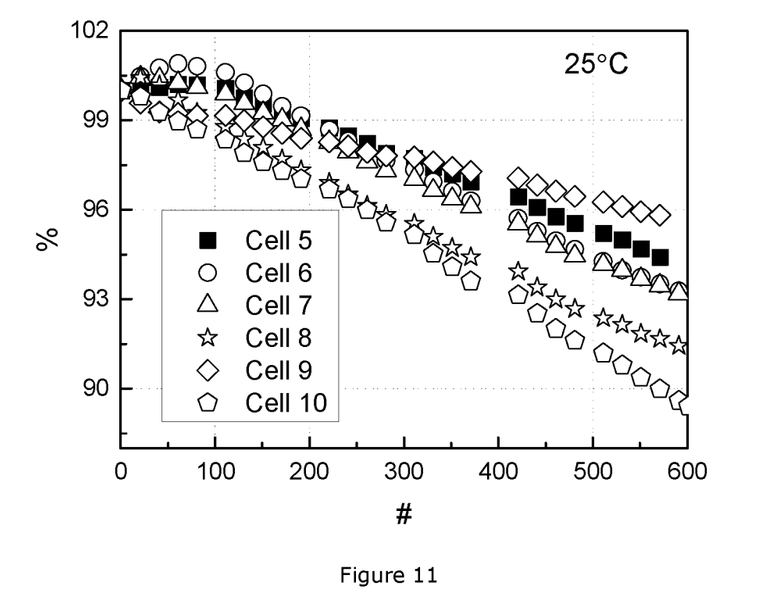
FIG. 11: capacity retention of Cells 5-10 during cycling at room temperature.

Discussion of the Examples by Comparison of Cells 5 to 10:

Cells 5 to 10 use the same electrode components and electrolyte solvent, the only difference between the cells are the electrolyte additives. Cell 10 has no electrolyte additives and serves as a reference sample. FIG. 11 illustrates the RT-cycling (at 25° C.) property of Cells 5 to 10 in a voltage range of 4.35 to 3.0V, represented as the plots of capacity retention versus cycle number. Compared to Cell 10, the other Cells all possess a higher capacity retention during cycling. This proves that the cyclability of a full cell is promoted by the electrolyte additives of Cells 5 to 10, which all contain $LiPO_2F_2$. As this result is already achieved for Cell 5 which has no additives other than $LiPO_2F_2$ it can be concluded that $LiPO_2F_2$ has a positive effect on improving the cycle stability of a high-Ni full cell. Additionally, in FIG. 11, the best cycling performance belongs to Cell 9, which contains electrolyte additives $LiPO_2F_2$ and VEC. Thus, $LiPO_2F_2$ and VEC have a certain synergetic effect on preventing capacity fading. Based on the results of Cells 6 and 8, the addition of PRS to $LiPO_2F_2$ is worse than for $LiPO_2F_2$ only. A synergetic effect PRS–$LiPO_2F_2$ as could be expected from the teachings of US 2012/0177818 A1 is not confirmed. This could be because the active electrode material tested there is pure $LiCoO_2$.

Figure 12:
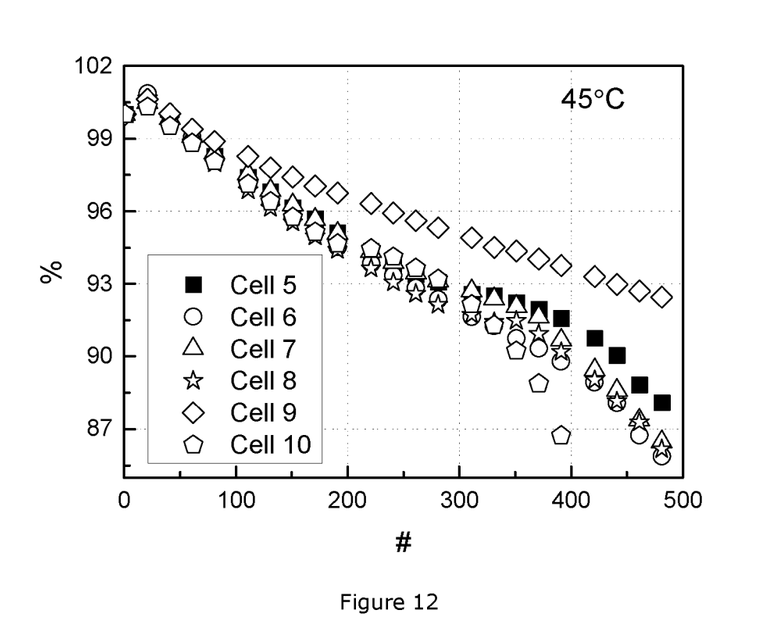
FIG. 12: capacity retention of Cells 5-10 during cycling at 45° C.

FIG. 12 shows the results of a similar cycling test at 45° C. The cyclability of cells at high temperature is worse but the effect of the electrolyte additives on cycle life is kept. Cell 9 still presents the greatest capacity retention, while Cell 10 shows the worst performance. Based on the results of Cells 6 and 8, the addition of PRS to $LiPO_2F_2$ is worse than for $LiPO_2F_2$ alone. According to the above analysis on cycling properties of Cells 5 to 10, it can be concluded that a $LiPO_2F_2$-based electrolyte is beneficial for the cycling properties of a full cell at high voltage where "AF-NMC622" serves as cathode material. The cycling stability is further improved when such electrolyte is supplemented with VEC.

Figure 13:
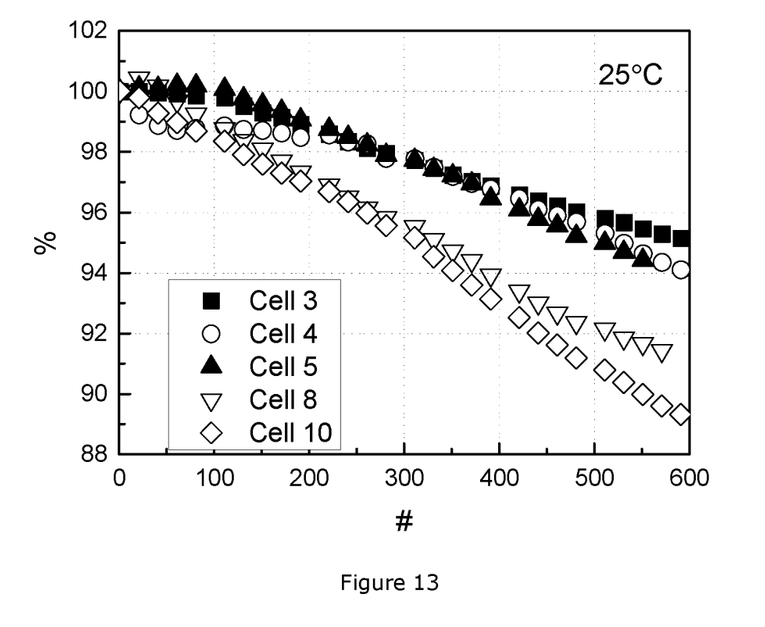
FIG. 13: capacity retention of Cells 3, 4, 5, 8 and 10 during cycling at room temperature.
Figure 14:
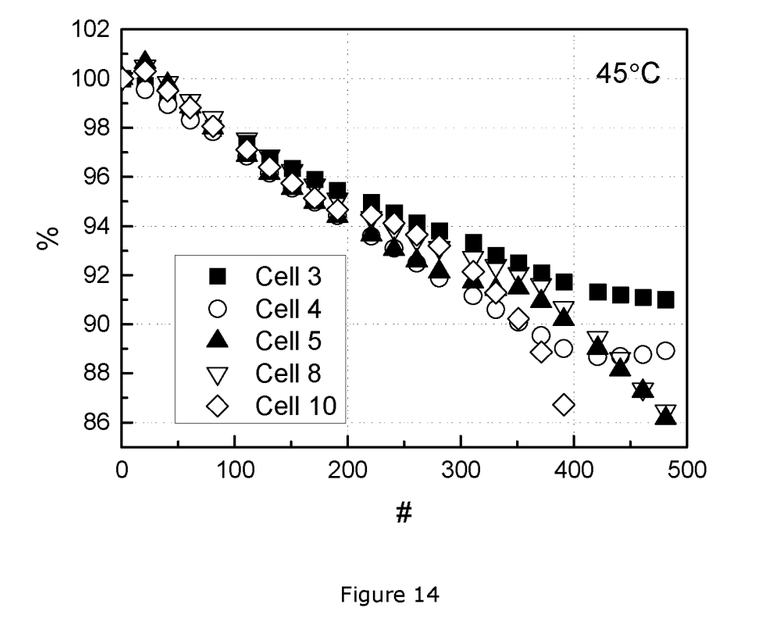
FIG. 14: capacity retention of Cells 3, 4, 5, 8 and 10 during cycling at 45° C.

Discussion of the Examples by comparison of Cells 3, 4, 5, 8 & 10: The cyclability of cells 3, 4, 5, 8 & 10 in FIG. 13 (at room temperature) and FIG. 14 (at 45° C.) proves that "Electrolyte 1" (Cells 3-4) is more effective than "Electrolyte 2" (Cells 5 & 8), and that there is a synergetic effect between the use of a $LiPO_2F_2$-based electrolyte and that electrolyte containing additional additives LiBOB, VC and PRS (in Cell 3). The addition of VC in "Electrolyte 1" seems to compensate for the bad result of Cell 8 ("Electrolyte 2"+PRS+LiBOB).

The conclusion of all these discussions is that:
the modification of the electrolyte, by addition of $LiPO_2F_2$, is not sufficient to provide an improved rechargeable lithium ion battery for automotive applications that allows to increase the charge voltage to 4.2, 4.3, 4.35V or even beyond,
neither is the application of an Al-based surface enrichment taken on its own,
but surprisingly, there can be found a synergy between the modification of the electrolyte and the surface enrichment of the active material according to the invention.

The invention claimed is:
1. A rechargeable lithium ion battery comprising a positive electrode, a negative electrode and an electrolyte, the positive electrode comprising a lithium nickel manganese cobalt oxide-based powder with particles comprising a core and a surface layer, the core having a layered crystal structure comprising the elements Li, M and oxygen, wherein M has the formula $M=(Ni_z(Ni_{1/2}Mn_{1/2})_yCo_x)_{1-k}A_k$, with $0.13 \le x \le 0.30$, $0.20 \le z < 0.55$, $x+y+z=1$ and $0 < k \le 0.1$, wherein A is at least one dopant and comprises Al, wherein the Al content in the core is 0.3-3 mole %, and wherein the surface layer is delimited by an outer and an inner interface, the inner interface being in contact with the core, and wherein the surface layer has an Al content that increases from the Al content of the core at the inner interface to at least 4 mole % at the outer interface, the Al content being determined by XPS, lithium nickel manganese cobalt oxide-based powder having a molar ratio $0.95 \le Li:M \le 1.10$, wherein the surface layer comprises a mixture of elements of the core Li, M and O and alumina, and wherein the electrolyte comprises the additive lithium difluorophosphate.

2. The rechargeable lithium ion battery of claim 1, wherein the surface layer of the lithium nickel manganese cobalt oxide-based powder particles further comprises LiF.

3. The rechargeable lithium ion battery of claim 2, wherein the core of the lithium nickel manganese cobalt oxide-based powder particles has a F content of less than 0.05 mole %, and wherein the surface layer has an Al content that increases from the Al content of the core at the inner interface to at least 10 mole % at the outer interface, and a F content that increases from less than 0.05 mole % at the inner interface to at least 3 mole % at the outer interface, the Al and F contents being determined by XPS.

4. The rechargeable lithium ion battery of claim 1, wherein the surface layer further comprises either one or more compounds selected from the group consisting of CaO, $TiO_2$, MgO, $WO_3$, $ZrO_2$, $Cr_2O_3$ and $V_2O_5$.

5. The rechargeable lithium ion battery of claim 1, wherein for the lithium nickel manganese cobalt oxide-based powder A=Al, k=0.005-0.013, x=0.20±0.02, y=0.40±0.05, z=0.40±0.05 and 1≤Li:M≤1.10.

6. The rechargeable lithium ion battery of claim 1, wherein the electrolyte comprises between 0.5 and 2 wt % of lithium difluorophosphate.

7. The rechargeable lithium ion battery of claim 6, wherein the electrolyte further comprises up to 2 wt % of vinyl ethylene carbonate.

8. The rechargeable lithium ion battery of claim 6, wherein the electrolyte further comprises up to 2 wt % of one or more additives selected from the group consisting of lithium bis(oxalate)borate, vinylene carbonate and 1,3-propene sultone.

9. The rechargeable lithium ion battery of claim 1, wherein the electrolyte comprises a solvent comprising either one or more of EC, DEC or EMC.

10. The rechargeable lithium ion battery of claim 1, the battery operating after charging to a final voltage >4.2V.

11. A method for preparing the rechargeable lithium ion battery of claim 1, comprising:

incorporating a lithium nickel manganese cobalt oxide-based powder in a positive electrode, the powder comprising particles comprising a core and a surface layer, the core having a layered crystal structure comprising the elements Li, M and oxygen, wherein M has the formula $M=(N_z(Ni_{1/2}Mn_{1/2})_yCo_x)_{1-k}A_k$, with 0.13≤x≤0.30, 0.20≤z<0.55, x+y+z=1 and 0<k≤0.1, wherein A is at least one dopant and comprises Al, the surface layer comprises a mixture of elements of the core Li, M and O, and the lithium nickel manganese cobalt oxide-based powder having a molar ratio 0.95≤Li:M≤1.10, providing a negative electrode, providing an electrolyte comprising the additive lithium difluorophosphate, and assembling the positive electrode, the negative electrode and the electrolyte in the battery.

* * * * *